(12) United States Patent
Kaczynski

(10) Patent No.: US 7,370,154 B2
(45) Date of Patent: May 6, 2008

(54) METHOD AND APPARATUS FOR MAINTAINING COHERENCE INFORMATION IN MULTI-CACHE SYSTEMS

(75) Inventor: Tomasz Kaczynski, Prior Lake, MN (US)

(73) Assignee: Silicon Graphics, Inc., Sunnyvale, CA (US)

(*) Notice: Subject to any disclaimer, the term of this patent is extended or adjusted under 35 U.S.C. 154(b) by 500 days.

(21) Appl. No.: 10/785,575

(22) Filed: Feb. 24, 2004

(65) Prior Publication Data
US 2005/0188160 A1  Aug. 25, 2005

(51) Int. Cl.
*G06F 12/00* (2006.01)
(52) U.S. Cl. ............... 711/141; 711/119; 711/128; 711/144
(58) Field of Classification Search .............. None
See application file for complete search history.

(56) References Cited

U.S. PATENT DOCUMENTS

| | | | |
|---|---|---|---|
| 5,564,035 A * | 10/1996 | Lai ......................... | 711/144 |
| 6,266,743 B1 * | 7/2001 | Carpenter et al. ......... | 711/143 |
| 6,338,123 B2 * | 1/2002 | Joseph et al. ............. | 711/144 |
| 6,405,292 B1 * | 6/2002 | Joseph et al. ............. | 711/150 |
| 6,826,651 B2 * | 11/2004 | Michael et al. ............ | 711/119 |
| 2002/0002659 A1 * | 1/2002 | Michael et al. ............ | 711/141 |
| 2002/0078304 A1 * | 6/2002 | Masri et al. .............. | 711/134 |

OTHER PUBLICATIONS

David, J. L., et al., "A Superassociative Tagged Cache Coherence Directory", Supported in part by NSF grant No. 9209458, University of Minnesota, Minneapolis, 4 pgs.

* cited by examiner

*Primary Examiner*—Hyung S. Sough
*Assistant Examiner*—Kaushik Patel
(74) *Attorney, Agent, or Firm*—Schwegman, Lundberg & Woessner, P.A.

(57) ABSTRACT

A method and apparatus for maintaining coherence information in multi-cache systems is described herein. In one embodiment, the apparatus includes an Ingrained Sharing Directory Cache (ISDC) to store state information about recent copies of local memory blocks. The ISDC is adapted to receive Ingrained Sharing Directory Storage (ISDS) requests and create ISDC entries from information presented by the ISDS. The apparatus also includes an ISDC pending queue to store pending ISDC operations.

10 Claims, 9 Drawing Sheets

METHOD AND APPARATUS FOR MAINTAINING COHERENCE INFORMATION IN MULTI-CACHE SYSTEMS

LIMITED COPYRIGHT WAIVER

A portion of the disclosure of this patent document contains material to which the claim of copyright protection is made. The copyright owner has no objection to the facsimile reproduction by any person of the patent document or the patent disclosure, as it appears in the U.S. Patent and Trademark Office file or records, but reserves all other rights whatsoever.

FIELD

This invention generally relates to the field of data storage and retrieval and more particularly to directory structure and processing of coherence requests in multi-cache systems.

BACKGROUND

In shared memory multiprocessor systems several copies of the same memory line can be cached in the system, hence a coherence mechanism is required to maintain consistency among the copies. The two most common coherence schemes are directory-based protocols and snooping protocols. Directory based cache coherence solves the bandwidth problem of snoopy schemes, but introduces directory storage overhead that can grow faster than linearly with the number of shared caches. For example, traditional full map bit-vector directories do not scale well with Moore's Law due to memory overhead concerns.

Traditional dynamically tagged directories use special-purpose pointer caches, which are subject of two types of overflow: 1) pointer overflow—pointer overflow limits the number of sharers; and/or 2) set overflow—set overflow forces premature invalidation of cache lines.

Traditional full map bit-vector directory requires an entry for each cache line sized memory line. Given that, the number of entries in the traditional full map bit-vector directory for moderately large-scale multiprocessors can be very large. This prevents full map bit-vector directories from being embedded either into hub or processor chips.

SUMMARY

A method and apparatus for maintaining coherence of cache lines in multi-cache shared memory systems are described herein. In one embodiment the method includes receiving in an Ingrained Sharing Directory Cache (ISDC) an incoming coherence operation request including an associated incoming memory address. The method also includes completing a pending ISDC entry if the incoming request is an Ingrained Sharing Directory Storage (ISDS) DATAREPLY reply and performing the incoming operation, if there is an ISDC entry associated with the incoming address. The method also includes creating an ISDC entry if there is no ISDC entry associated with the incoming operation request; wherein creation includes, requesting information associated with the incoming memory address, wherein the information is requested from an Ingrained Sharing Directory Storage (ISDS). The creation also includes evicting another ISDC entry if there is no free ISDC entry; wherein the eviction includes requesting an ISDS to store information evicted from the other ISDC entry, designating the evicted ISDC entry to the incoming request, marking the evicted ISDC entry as pending, and storing the incoming operation in an ISDC pending queue.

In one embodiment the apparatus includes the Ingrained Sharing Directory Storage (ISDS) to store state information about copies of local memory lines whose directory entries were evicted from the ISDC, wherein the ISDS includes a first set of cells, wherein each cell contain plurality of entries, wherein each entry can contain state information about a copy of a local memory line and wherein each entry does not contain state information about a copy of a remote memory line. The apparatus also includes a second set of coherence buffers, wherein each of the coherence buffers includes ones of the first set of cells, and wherein each of the coherence buffers maintains a dynamic full map of memory lines cached in the system caches and whose entries were evicted from the ISDC. The apparatus also includes an Ingrained Sharing Directory (ISD) controller to receive memory requests for and fetch the state information from the ISDC. The apparatus also includes a crossbar interface to determine whether the memory requests refer to the local memory lines.

BRIEF DESCRIPTION OF THE FIGURES

The present invention is illustrated by way of example and not limitation in the Figures of the accompanying drawings in which.

DESCRIPTION OF THE EMBODIMENTS

Methods and apparatus for maintaining coherence of cache lines in multi-cache shared memory systems are described herein. In the following description, numerous specific details are set forth. However, it is understood that embodiments of the invention may be practiced without these specific details. In other instances, well-known circuits, structures and techniques have not been shown in detail in order not to obscure the understanding of this description. Note that in this description, references to "one embodiment" or "an embodiment" mean that the feature being referred to is included in at least one embodiment of the invention. Further, separate references to "one embodiment" in this description do not necessarily refer to the same embodiment; however, neither are such embodiments mutually exclusive, unless so stated and except as will be readily apparent to those of ordinary skill in the art. Thus, the present invention can include any variety of combinations and/or integrations of the embodiments described herein. Moreover, in this description, the phrase "exemplary embodiment" means that the embodiment being referred to serves as an example or illustration.

Herein, block diagrams illustrate exemplary embodiments of the invention. Also herein, flow diagrams illustrate operations of the exemplary embodiments of the invention. The operations of the flow diagrams will be described with reference to the exemplary embodiments shown in the block diagrams. However, it should be understood that the operations of the flow diagrams could be performed by embodiments of the invention other than those discussed with reference to the block diagrams, and embodiments discussed with references to the block diagrams could perform operations different than those discussed with reference to the flow diagrams. Moreover, it should be understood that although the flow diagrams depict serial operations, certain embodiments could perform certain of those operations in parallel.

This description of the embodiments is divided into three sections. In the first section, an exemplary hardware and operating environment is described. In the second section, a system level overview is presented. In the third section, operations performed by exemplary embodiments are described.

Hardware and Operating Environment

This section provides an overview of the exemplary hardware and the operating environment in which embodiments of the invention can be practiced.

Figure 1:
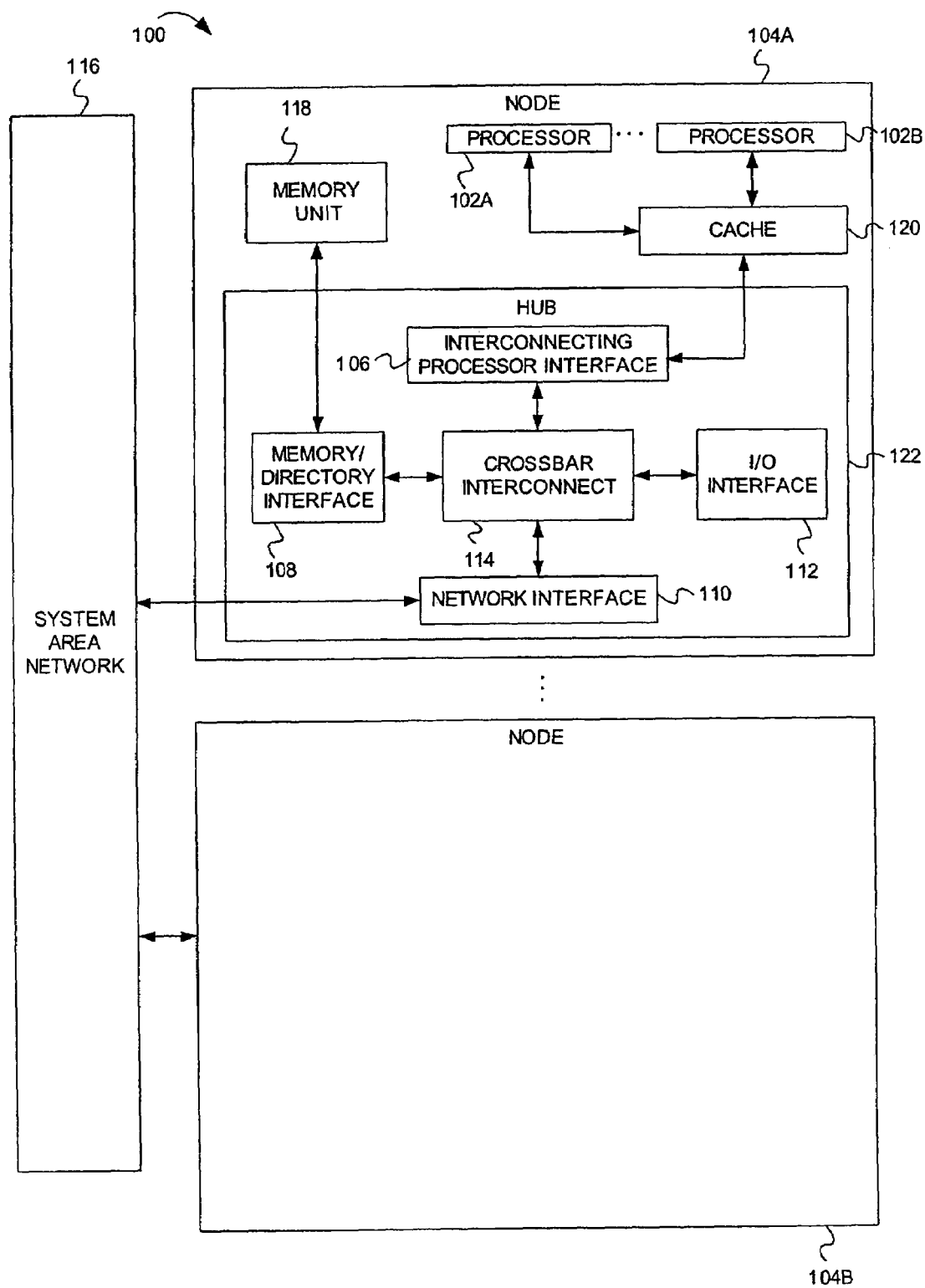
FIG. 1 illustrates an exemplary shared memory system used in conjunction with certain embodiments of the invention.

FIG. 1 illustrates an exemplary computer system used in conjunction with certain embodiments of the invention. In FIG. 1, the computer system 100 comprises nodes 104A and 104B. In one embodiment, the computer system 100 comprises N nodes, where N is any suitable number of nodes. The node 104A includes a memory unit 118, processors 102A and 102B, a cache 120, and a hub 122. In one embodiment, each node includes a set of P processors, where P is any suitable number of processors. The hub 122 includes a crossbar 114, interconnecting processor interface 106, network interface 110, memory/directory interface 108, and I/O interface 112. In one embodiment the memory/directory interface 108 and/or cache 120 may be embedded into processor 102. The interconnecting processor interface 106 is connected to the cache 120. The network interface 110 is connected to the system area network 116. The memory/directory interface 108 is connected to the memory unit 118. Although it is not shown in FIG. 1, the node 104B includes all of the components shown in node 104A.

The processors 102A and 102B can be of any suitable processor architecture. As noted above, the node 104A can comprise one, two, or more processors, any of which can execute a set of instructions in accordance with embodiments of the present invention.

The memory unit 118 stores data and/or instructions and can comprise any suitable memory, such as a dynamic random access memory (DRAM), for example. The cache 120 can include any suitable fast memory, such as static random access memory (SRAM). In one embodiment, memory requests that can be fetched from the cache 120 take significantly less time to complete than those that are fetched from the memory unit 118. In one embodiment, the cache 120 is located on the same integrated circuit as the CPU, while in other embodiments it is not. According to embodiments, the cache 120 can be a direct mapped cache or k-way set associative cache, where the cache 120 has S sets, with k blocks in each set. In one embodiment, there is one cache 120 on each node, making N caches on the computer system 100. In one embodiment, there is a set of P caches on each node, where P is any suitable number of processors making the number of caches in the system, Q equal to the product of P times N.

In one embodiment, the hub 122 provides suitable arbitration and buffering for each interface. In one embodiment, the I/O interface 112 provides an interface to one or more suitable integrated drive electronics (IDE) drives, such as a hard disk drive (HDD) or compact disc read only memory (CD ROM) drive, or to suitable universal serial bus (USB) devices through one or more USB ports. In one embodiment, the I/O interface 112 also provides an interface to a keyboard, mouse, CD-ROM drive, etc.

In one embodiment, the network interface 120 provides an interface through which a given local node in the computer system 100 can communicate with other (remote) nodes and/or devices.

In one embodiment, the computer system 100 includes a machine-readable medium that stores a set of instructions (e.g., software) embodying any one, or all, of the methodologies for maintaining coherence information in multi-cache systems. Furthermore, software can reside, completely or at least partially, within the memory unit 118 and/or within the processors 102A and 102B.

According to embodiments of the invention, the functional units (e.g., the hub 122, memory/directory interface 108, etc.) of the computer system 100 can be integrated or divided, forming a lesser or greater number of functional units. According to embodiments, the functional units can include queues, stacks, and/or other data structures necessary for performing the functionality described herein. Moreover, the functional units can be communicatively coupled using any suitable communication method (message passing, parameter passing, signals, etc.). Additionally, the functional units can be connected according to any suitable interconnection architecture (fully connected, hypercube, etc.). Any of the functional units used in conjunction with embodiments of the invention can include machine-readable media including instructions for performing operations described herein. Machine-readable media includes any mechanism that stores information in a form readable by a machine (e.g., a computer). For example, a machine-readable medium includes read only memory (ROM), random access memory (RAM), magnetic disk storage media, optical storage media, flash memory devices. According to embodiments of the invention, the functional units can be other types of logic (e.g., digital logic) for executing the operations for directory-based cache coherence described herein.

System Level Overview

This section provides a system level overview of exemplary embodiments of the invention.

Figure 2:
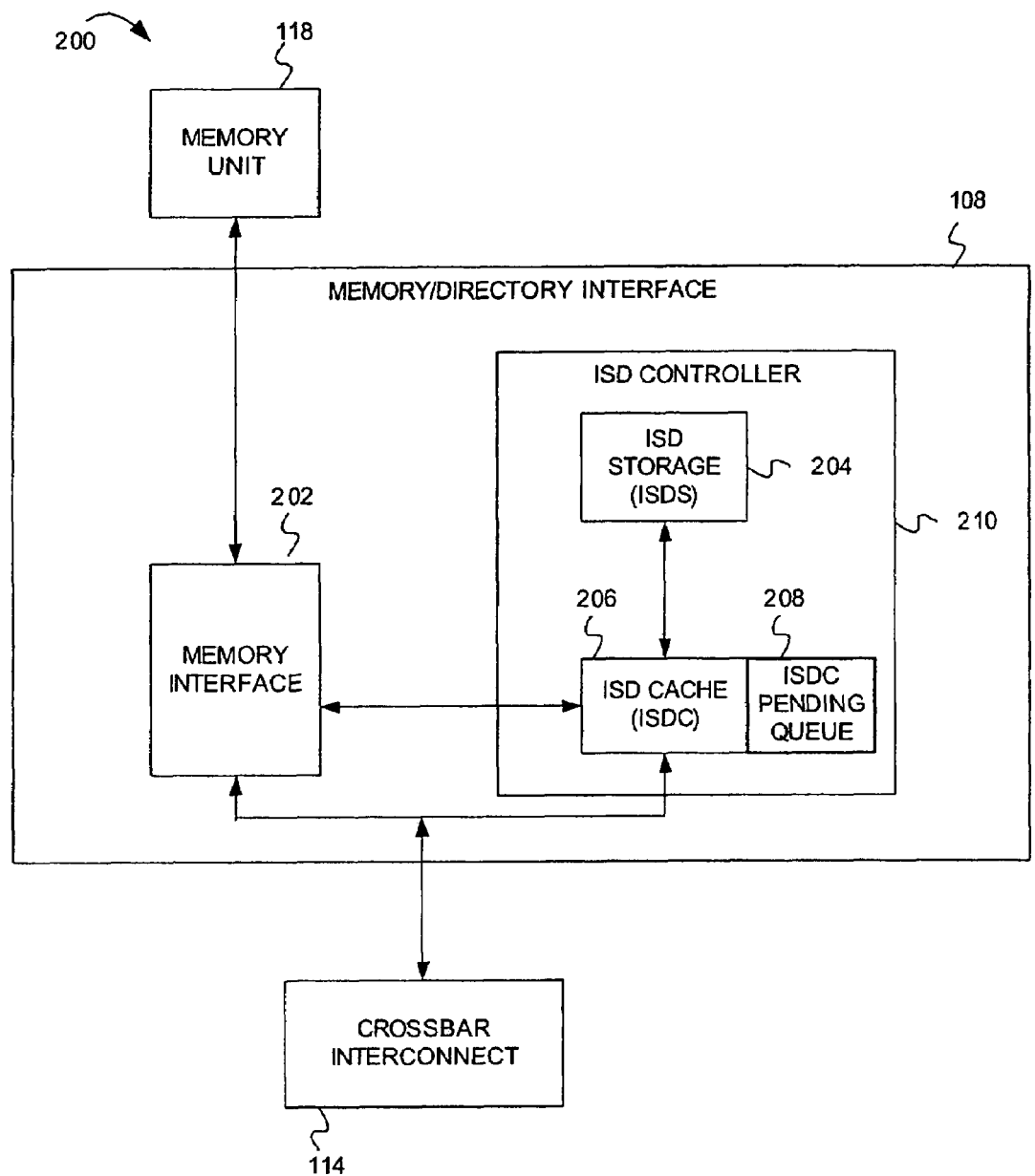
FIG. 2 is a block diagram illustrating details of the memory/directory interface, according to exemplary embodiments of the invention.

FIG. 2 is a block diagram illustrating a memory/directory interface in greater detail, according to exemplary embodiments of the invention. As shown in FIG. 2, the memory/directory interface 108 includes a memory interface 202, an Ingrained Sharing Directory (ISD) controller 210, an Ingrained Sharing Directory Cache (ISDC) 206, ISDC pending queue 208, and an Ingrained Sharing Directory Storage (ISDS) 204. The memory interface 202 and the ISD controller 210 are connected to the crossbar interconnect 114. The memory interface 202 is also connected to the memory unit 112.

In one embodiment, the memory interface 202 reads and writes the data from/to local memory unit usually in cache line size chunks. The ISD controller 210 stores information about cached copies of the local memory lines (i.e., memory lines in the local memory unit). It should be understood that local ISD controller 210 stores information about copies of the local memory lines. Each local ISD controller 210 is composed of a local ISDC 206, local ISDC pending queue, and a local ISDS 204. Together, they cooperate to maintain coherence of local memory lines present at any point in time in the system caches (both local and remote system caches).

ISD hashing scheme uses the incoming physical memory address to find the correct ISDS location to insert a new ISDS entry or to retrieve the existing one. Cache line replacement hints are used by system caches to signal to ISD controller 210 that a copy of a memory line was removed from a particular cache, so the ISD controller 210 can dynamically update its records accordingly. Super-associativity is used by the ISDS as a way to register multiple copies of a local memory line. Each ISDS entry is tagged with a memory tag derived from an incoming address, thus matching of incoming coherence requests with the ISD records is guaranteed. The number of entries in the ISDS 204 is equal to the number of cache lines in the system, hence full map directory scheme can be maintained. In summary, an ISD controller 210 uses memory line tags, super-associativity, cache line replacement hints, and ISD hashing scheme to maintain a dynamic full map directory of local memory lines cached in the system caches. The organization of the ISDS 204 will be described in more detail in FIG. 3.

In one embodiment, the ISDS 204 is augmented with an ISDC 206 for performance reasons. Of all the memory lines cached in the system only a small portion at a time is active (i.e., currently being used, e.g., by user applications or operating system). Such a small subset of cache lines usually generates a majority directory (coherence) requests. For active lines it is better to use the ISDC, where sharing information is stored in a bit-vector format (see below). In one embodiment, the number of the ISDC entries compared to the number of ISDS entries is relatively small, so sometimes the ISDC 206 has to evict an older entry to make a room for an incoming request. The evicted entry could be discarded, but this would require invalidation of all copies of this memory line. Therefore the evicted ISDC entry is stored in the ISDS 204 into possibly more than one entry that can be retrieved later if this memory line becomes active again.

The ISDC 206 has a number of ISDC entries. The structure of the ISDC entry will be described in FIG. 5. The detailed design of the ISDC 206 itself is beyond the scope of this invention, though it should be noted that the ISDC includes a number of sets of entries (i.e., the ISDC 206 can be a set-associative cache).

In one embodiment, the ISD controller 210 receives incoming coherence requests. If the ISDC 206 does not have an ISDC entry associated with the incoming coherence request, then an ISDC entry is selected to accommodate the incoming request and the ISDC requests further relevant information from the ISDS 204 (if any exists). Each entry in the ISDC 206 maintains the status of a memory line recently cached (possibly in several) system caches. In particular, ISDC information about memory line sharing is stored in a single entry in an explicit bit-vector form, whereas the ISDS 204 stores sharing information of a memory line by hashing it into an ISDS structure, with each sharer of the memory line (i.e. each system cache having a copy) having a separate ISDS entry.

In one embodiment, an ISDS 204 is used only as backup storage for information evicted from an ISDC 206 and processes STORE and RETRIVE operation requests received from an ISDC 206. The RETRIVE operation performs look-ups of a coherence buffer, extracts sharing information of a given memory line, and converts the ISDS sharing information into ISDC bit-vector format. For the sake of discussion DELETE operation requests from an ISDC are not shown in the FIG. 8 and FIG. 9. One should note that DELETE in a simplified version of the RETRIEVE operation with no bit-vector constructed and no information sent back to an ISDC.

To simplify the interaction of ISDC and ISDS the information of a given memory line either resides in ISDC or ISDS. This approach eliminates the need to propagate changes in the line state from ISDC to ISDS, hence fewer ISDS operations are required. The separate disjoint sets of entries are maintained with the help of destructive RETRIEVE operations in which retrieved ISDS information sent to ISDC is invalidated in ISDS.

Figure 3:
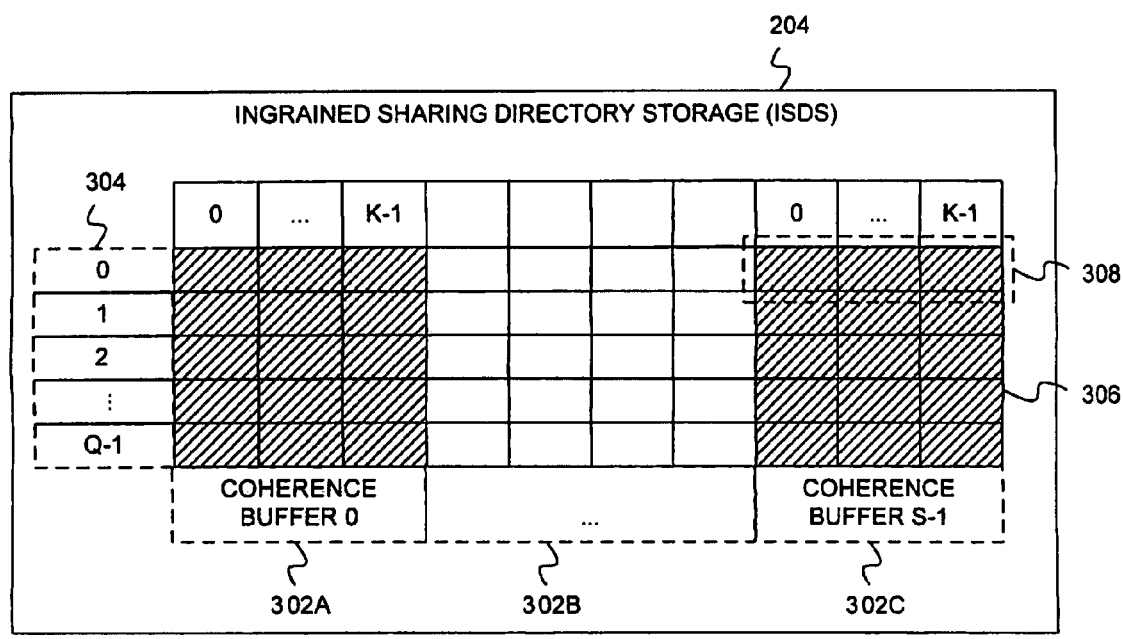
FIG. 3 is a block diagram illustrating an Ingrained Sharing Directory Storage (ISDS), according to exemplary embodiments of the invention.

FIG. 3 is a block diagram illustrating an Ingrained Sharing Directory Storage (ISDS), according to exemplary embodiments of the invention. The ISDS 204 includes a set of S coherence buffers, shown as coherence buffers 302A-302B. In one embodiment the number of coherence buffers is the same as the number of sets in each of the set-associative caches 120 in the computer system, S. Each of the coherence buffers 302 comprises Q sections 304. Each of the Q sections in each coherence buffer comprises of a number of cells 308. Each cell includes K ISDS entries 306. A more detailed description of an ISDS entry 306 will be described in FIG. 4. In one embodiment, the number of ISDS entries in each cell is the same as the number of blocks in each cache set.

Performance of a coherence buffer look-up operation performed by a RETRIEVE operation (as discussed in FIG. 2 above) depends on the number of cells 308 and the number of entries 306 in the cell 308. The number of entries in coherence buffer 302A-302B depends on the number of system caches, the set-associativity of the cache, and the size of the cache line.

In one embodiment, to improve performance of an ISD scheme, the coherence buffers can be partitioned. Each partition of a coherence buffer may have a separate ISDS, ISDC, and it would maintain state for local memory lines cached in a subset of system caches.

Figure 4:
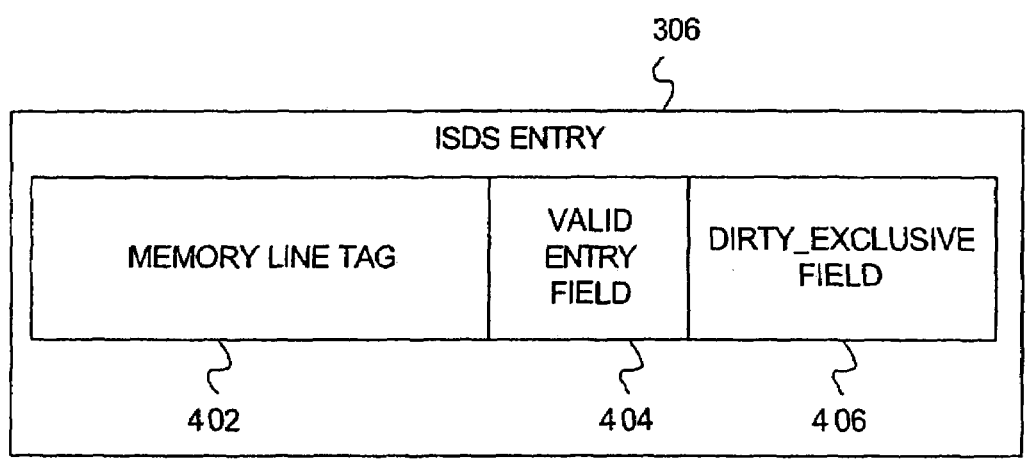
FIG. 4 is a block diagram illustrating details of an ISDS entry, according to exemplary embodiments of the invention.

FIG. 4 is a block diagram illustrating details of an ISDS entry, according to exemplary embodiments of the invention. A physical system address associated with an incoming coherence request is used to determine how a given copy of memory line is mapped into or located in the ISDS. In one embodiment, each ISDS entry 306 comprises memory address and the sharing state of local memory lines (i.e., memory lines of the local memory unit 118 cached in the system's caches. The ISDS entry 306 is composed of a memory line tag 402, a VALID_ENTRY field 404, and a DIRTY_EXCLUSIVE field 406. In a RETRIEVE operation the memory line tag of the incoming request is used to identify if there is a valid entry associated with a copy of the memory line in a cell. In one embodiment the memory line tag is a part of the address of the memory line. In one embodiment, the incoming memory line tag is compared with memory line tags 402 stored in the valid entries in the cell. Together the VALID_ENTRY field 404 and the DIRTY_EXCLUSIVE field 406 make up the cache line state of the ISDS entry. The states of a memory line are listed in Table 1 below. If a memory line is in the SHARED state there might be more than one copy of this line present in the system caches. The valid_entry field 404 if asserted indicates that an entry is valid and that the copy of this line is present in the system cache indicated by the cell number. The dirty_exclusive field 406 if asserted indicates that there is only a single copy of a memory line in the system and the copy is more recent than the data in main memory.

TABLE 1

Line state encoding for an ISDS entry

| Valid field | Dirty_Exclusive field | Line state |
| --- | --- | --- |
| Deasserted | Don't care | Invalid ISDS entry |
| Asserted | Deasserted | SHARED |
| Asserted | Asserted | DIRTY-EXCLUSIVE |

System Operations

This section describes operations performed by embodiments of the invention. In certain embodiments, the methods are performed by instructions on a machine-readable media (e.g., software), while in others embodiments, the methods are performed by hardware or other logic (e.g., digital logic).

Figure 5:
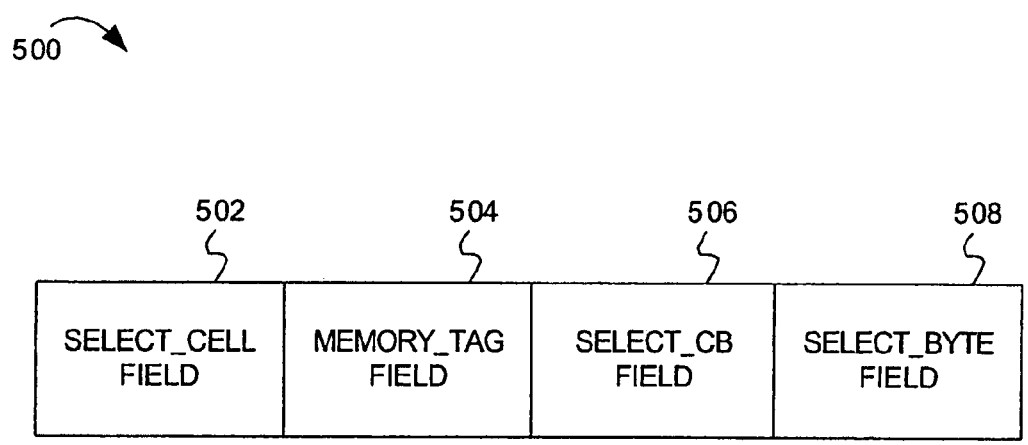
FIG. 5 is a block diagram illustrating an ISDS interpretation of an incoming system wide physical memory address, according to exemplary embodiments of the invention.

FIG. 5 is a block diagram illustrating the ISDS 204 interpretation of an incoming system-wide physical memory address. The ISDS 204 interpretation of an incoming system-wide physical memory address 500 includes a SELECT_CELL field 502, a MEMORY_TAG field 504, a SELECT_CB field 506, and a SELECT_BYTE field 508. E.g. when an ISDS 204 receives a STORE or RETRIEVE operation request from an ISDC 206, as described above in FIG. 2, it also receives system-wide physical memory address 500 associated with the STORE or RETRIEVE operation. Both the ISDC 206 and the ISDS 204 use the system-wide physical memory address to locate the appropriate cells and/or entry/entries. The SELECT_CB field 506 is used to select the coherence buffer 302A-302B. The SELECT_CELL field 502 is used to select a cell 306 within a selected coherence buffer 302A-302B. In one embodiment the multiprocessor system may have following parameters: local memory unit: 256 GB, cache size: 64 MB, cache line size: 128 B, cache associativity k=16, and number of caches: 32. In such system SELECT_CELL field=5 bits, MEMORY_TAG field=16 bits, SELECT_CB field=15 bits, and SELECT_BYTE=7 bits giving a system wide physical address of 43 bits (i.e., 8 TB of system memory).

Figure 6:
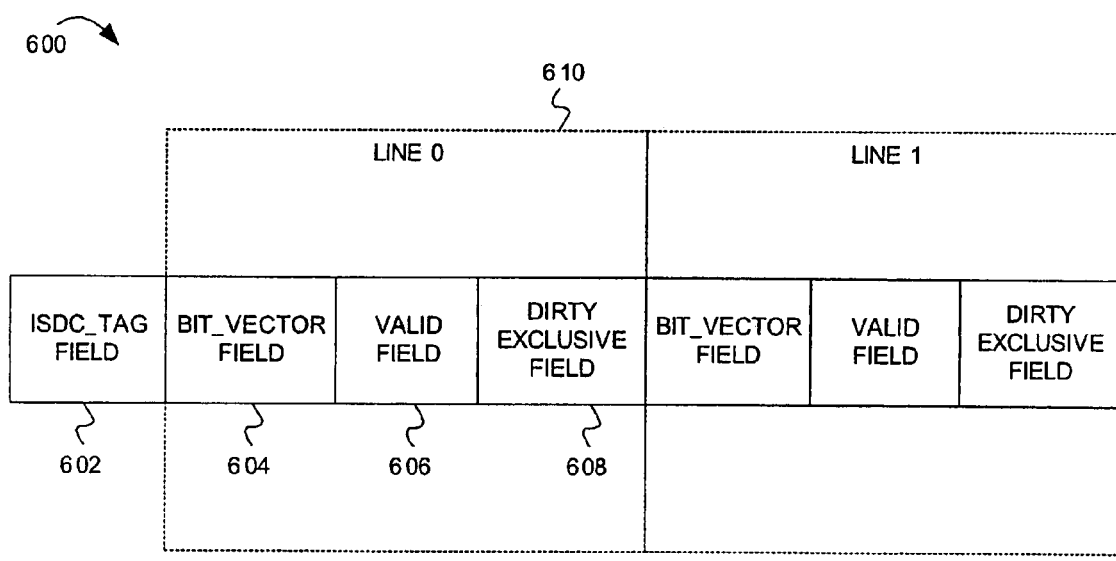
FIG. 6 is a block diagram illustrating details of an ISDC entry, according to exemplary embodiments of the invention.

FIG. 6 is a block diagram illustrating the format of an ISDC entry. An ISDC entry 600 includes an ISDC_TAG field 602 and one or more memory line sections 610. Each memory line section 610 includes a BIT_VECTOR field 604, a VALID ENTRY field 606 and a DIRTY EXCLUSIVE field 608. Each ISDC entry has a single ISDC_TAG field 602. In one embodiment, an ISDC entry can accommodate multiple memory lines located sequentially in the local memory module. For example, to accommodate 2 memory lines, the ISDC_TAG field 602 would contain a tag $T_0$ for memory line 0. The ISDC entry could also accommodate memory line 1 with memory tag $T_1=T_0+1$. Such entry format works well with the most common stride one memory access patterns. Each section 610 contains a BIT_VECTOR field 604 that has bits indicating presence (when asserted) of a copy of a memory line in an associated system cache. The system cache number corresponds to the bit number in the BIT_VECTOR field 604 (e.g., bit 5 asserted means that the copy of a memory line is present in the cache 5). Each section 610 also contains a VALID ENTRY field 606 and DIRTY_EXCLUSIVE field 608. The encoding of ISDC entry state and line state are provided in Table 2 below:

TABLE 2

Line state encoding for an ISDC entry

| Valid field | Dirty-Exclusive field | Line state |
| --- | --- | --- |
| Deasserted | Deasserted | Invalid ISDC entry |
| Deasserted | Asserted | Pending ISDC entry |
| Asserted | Deasserted | SHARED |
| Asserted | Asserted | DIRTY-EXCLUSIVE |

Figure 7:
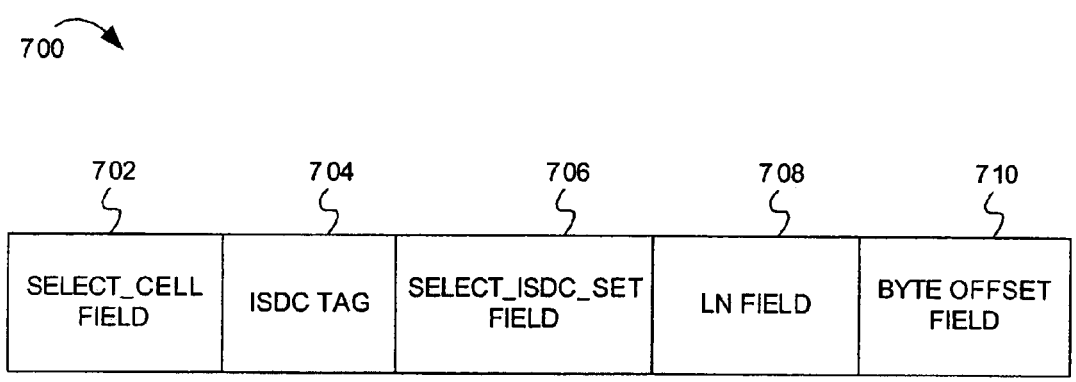
FIG. 7 is a block diagram illustrating an ISDC interpretation of an incoming system wide physical memory address, according to exemplary embodiments of the invention.

FIG. 7 is a block diagram illustrating an ISDC 206 interpretation of an incoming system-wide physical memory address. When an ISDC 206 receives a coherence request, it also receives a system-wide physical memory address. The ISDC uses this system-wide physical memory address to map an ISDC entry. The ISDC memory address interpretation 700 includes a SELECT_CELL field 702, an ISDC_TAG 704, a SELECT_ISDC_SET field 706, an LN field 708 and a BYTE_OFFSET field 710. The SELECT_ISDC_SET field 706 points to the proper set in the ISDC 206. The ISDC_TAG field 704 is used to determine if there is a cache hit in the ISDC set. The BYTE_OFFSET field 710 provides a byte pointer to data in the memory line. The LN field 708 selects the LINE 0 or LINE 1 in an ISDC entry (see FIG. 6).

Figure 8:
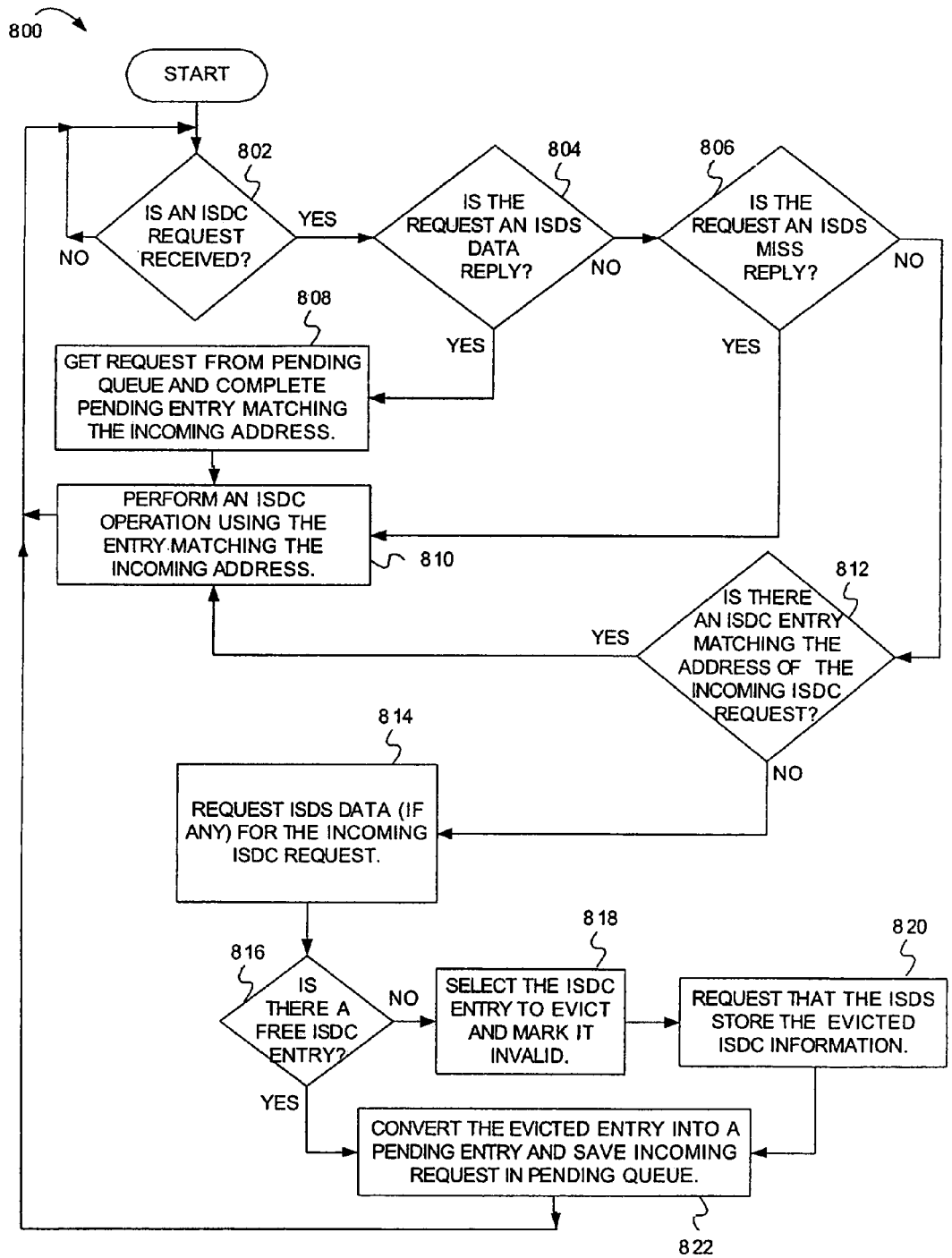
FIG. 8 is a flow diagram illustrating operations for the processing of ISDC coherence operations, according to exemplary embodiment of the invention.

FIG. 8 is a flow diagram illustrating operations for processing a request, according to exemplary embodiments of the invention. The flow diagram 800 will be described with reference to the exemplary embodiments shown in FIGS. 1 and 2. At the START block the ISDC 206 gets initialized including deasserting of the VALID and DIRTY-EXCLUSIVE fields in all ISDC entries. The flow diagram 800 commences at block 802.

At block 802, it is determined whether an ISDC received request. For example, the ISDC 206 determines whether it has received an ISDS reply or a coherence request from a local or remote processor. In one embodiment the request (or reply) includes a system-wide memory address of a memory line in the local memory unit 818. If a request has not been received, the flow continues at block 802. Otherwise, the flow continues at block 804.

At block 804, it is determined whether the request is an ISDS data reply. For example, the ISDC 206 determines whether the request is an ISDS data reply (i.e. a data reply from an ISDS 204) that includes sharing information about a memory line. If the request is an ISDS data reply, the flow continues at block 808. Otherwise, the flow continues at block 806.

At block 806, it is determined whether the request is an ISDS miss reply. For example, the ISDC 206 determines whether the request is an ISDS miss reply. In one embodiment, the ISDC 206 inspects the ISDS flags to make this determination. If the request is an ISDS miss reply, the flow continues at block 810. Otherwise, the flow continues at block 812.

At block 808, the pending ISDC entry that matches the incoming address is completed and the request is gotten from the pending queue. In one embodiment, an ISDC entry in pending state has VALID state deasserted and DIRTY-EXCLUSIVE state asserted indicating that the ISDC entry is waiting to receive state information from the ISDS 204. In one embodiment, when the ISDC 206 completes a pending ISDC entry, it stores the bit-vector and state information in an ISDC entry that is marked as pending. The flow continues at block 810.

At block 810, an ISDC operation is performed using the entry matching the incoming request. For example, the ISDC 206 performs an ISDC operation using the entry matching the incoming request. In one embodiment, performing the ISDC operation updates the coherence information stored in the matching entry. The flow continues at block 802.

At block 812, it is determined whether there is an ISDC entry matching the address of the incoming ISDC request. For example, the ISDC 206 compares the MEMORY_TAG field 504 of the incoming memory address to ISDC_TAG fields 602 of its ISDC entries. If there is a match, the flow continues at block 810. If there is no match, the flow continues at block 814.

Figure 9:
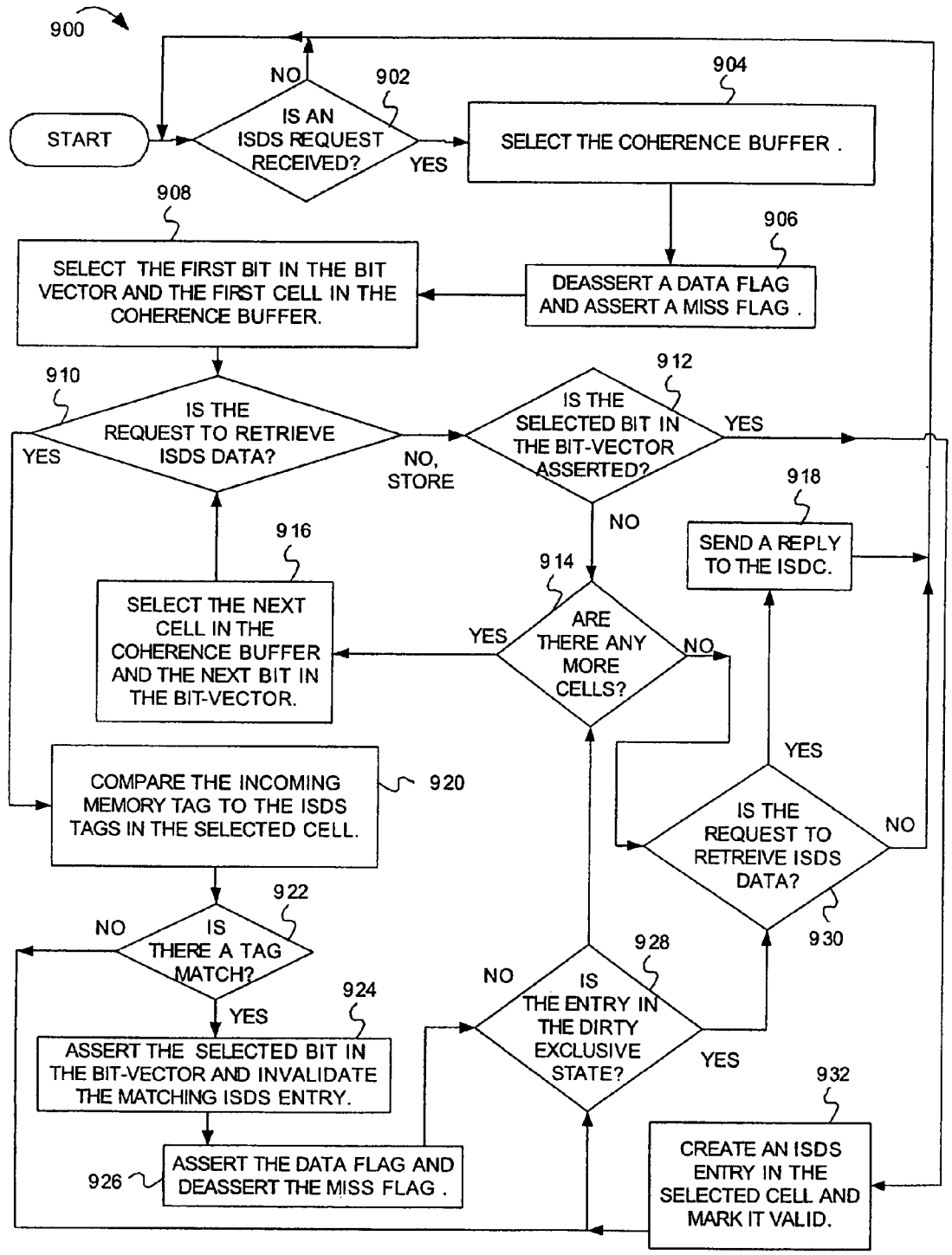
FIG. 9 is a flow diagram illustrating operations for processing ISDS requests, according to exemplary embodiments of the invention.

At block 814, ISDS data is requested for the incoming ISDC request. For example, the ISDC 206 transmits to the ISDS 204 a RETREIVE request. The RETREIVE request asks for sharing information of memory line pointed to by the incoming memory address. FIG. 9 below describes ISDS operations retrieving previously evicted ISDC information. The flow continues at block 816.

At block 816, it is determined whether there is a free ISDC entry. For example, the ISDC 206 determines whether there is a free ISDC entry for storing the incoming address in the ISDC 206. In one embodiment, the ISDC entry is free and can accommodate the incoming request if such entry is in an invalid state. If there is a free ISDC entry, the flow continues at block 816. Otherwise, the flow continues at block 818.

At block 818, an ISDC entry selected for eviction and invalidation. For example, the ISDC 206 selects an entry to evict and marks it invalid. In one embodiment, an eviction policy is used to determine which ISDC entry should be evicted. The flow continues at block 820.

At block 820, a request is made that the ISDS store the evicted ISDC information. For example, the ISDC 206 sends a STORE request to the ISDS 204. FIG. 9 below describes ISDS operations for storing evicted ISDC information. The flow continues at block 822.

At block 822, the evicted entry is converted into a pending entry and the incoming request is saved in a pending queue. For example, in one embodiment the ISDC 206 copies the MEMORY_TAG field to a freed ISDC entry, and marks the entry as pending (VALID field is deasserted and DIRTY EXCLUSIVE field is asserted), and puts incoming request into the ISDC pending queue. The flow continues at block 802.

FIG. 9 is a flow diagram illustrating operations for processing ISDS requests, according to exemplary embodiments of the invention. The operations of flow diagram 900 will be described with reference to the exemplary embodiments shown in the block diagrams. At the START block the ISDS gets initialized including deasserting of the VALID field in all ISDS entries. The flow diagram 900 commences at block 902.

At block 902, it is determined whether an ISDS request is received. For example, an ISDS 204 determines whether an ISDS STORE or RECEIVE request is received from an ISDC 206. In one embodiment, the ISDS request includes a system-wide memory address for a memory line that resides in the local memory unit 818. If an ISDS request is received, the flow continues at block 904. Otherwise, the flow continues at block 902.

At block 904 a coherence buffer is selected. For example, the ISDS 204 selects a coherence buffer. In one embodiment, the ISDS 204 uses the SELECT_CB field 502 of the incoming memory address to select a coherence buffer. The flow continues at block 906.

At block 906, a data flag is deasserted and a miss flag is asserted. For example, the ISDS 204 deasserts a data flag and asserts a miss flag. If the requested data is found further down in the ISDS repository then the data flag would be asserted and the miss flag would be deasserted. These flags are used when sending responses to ISDS RETRIEVE requests to indicate whether the requested information was located or not. The flow continues at block 908.

At block 908, the first bit in the bit vector and the first cell in the selected coherence buffer are selected. For example, in one embodiment, the ISDS STORE request includes the ISDC BIT_VECTOR and line state fields. The ISDS 204 selects the first bit in the ISDC BIT_VECTOR field 604 and the first cell in the selected ISDS coherence buffer. The flow continues at block 910.

At block 910, it is determined whether the operation is a request to retrieve data. For example, the ISDS 204 determines whether the operation is a RETREIVE request from the ISDC 206. In one embodiment, the RETREIVE operation requests retrieval of sharing information for a memory line pointed to by the incoming memory address. If the request is a request to RETRIEVE data, the flow continues at block 920. Otherwise, the flow continues at block 912.

At block 912 (i.e., STORE case), it is determined whether the selected bit in the bit-vector is asserted. The ISDS 204 determines whether the selected bit in the ISDC BIT_VECTOR field 604 is asserted. The asserted bit in the ISDC BIT VECTOR means that the system cache indicated by the position of the asserted bit contains a copy of the memory line pointed by the incoming memory address. If the bit is asserted, the flow continues at block 932. If the bit is not asserted, the flow continues at block 914.

At block 914, it is determined whether there are any more cells in the selected coherence buffer. For example, the ISDS 204 determines whether there are any more cells in the selected coherence buffer. If there are no more cells in the selected coherence buffer, the flow continues at block 930. Otherwise, the flow continues at block 916.

At block 916, the next cell in the selected coherence buffer and the next bit in the bit-vector are selected. For example, the ISDS 204 selects the next cell in the selected coherence buffer and the next bit in the ISDC BIT_VECTOR field 604. From block 916, the flow continues at block 910.

At block 918, a reply is sent to the ISDC. For example, the ISDS 204 sends a reply to the ISDC 206. In one embodiment, the reply includes sharing information extracted from ISDS entry/entries. In one embodiment, the reply includes the DATA_FLAG and a MISS_FLAG (see discussion of FIG. 8 above). In one embodiment, the reply includes an ISDC BIT_VECTOR field 604 and line state field. The flow continues at block 902.

At block 920, the incoming memory tag is compared to the ISDS tags in the selected cell. For example, the ISDS 204 compares the MEMORY_TAG field 504 of the incoming memory address to the memory line tag(s) 402 of all valid ISDS entries 306 in the selected cell. The flow continues at block 922.

At block 922, it is determined whether there is a tag match. For example, the ISDS 204 determines whether there is a tag match. If so, the flow continues at block 924. If not, the flow continues at block 928.

At block 924, the selected bit in the bit-vector is asserted and the matching ISDS entry is invalidated. For example, the ISDS 204 asserts the selected bit in the ISDC BIT_VECTOR field 604 and invalidates the matching ISDS entry 306. In one embodiment an ISDS entry 306 is invalidated by deasserting the valid entry field 404 to indicate that the entry is invalid. The flow continues at block 926.

At block 926, the data flag is asserted and the miss flag is deasserted. For example, the ISDS 204 marks the DATA_FLAG to indicate the requested data was found and the MISS_FLAG to indicate that there was not a miss in the ISDC 206. The flow continues at block 928.

At block 928, it is determined whether the entry is in the dirty-exclusive state. For example, the ISDS 204 determines whether the selected valid entry is in the dirty-exclusive state or in the shared state by examining the dirty exclusive field 406. If the entry is in the dirty-exclusive state, the flow continues at block 930. Otherwise, the flow continues at block 914.

At block 930, it is determined whether the request is to retrieve ISDS data. For example, the ISDS 204 determines whether the request is a RETREIVE request. If the request is not to retrieve ISDS data, the flow continues at block 902. If it is, the flow continues at block 918.

At block 932, an ISDS entry is created in the selected cell and is marked valid. For example, the ISDS 204 uses information included in the request to create an ISDS entry 306. In one embodiment the ISDS 204 uses the MEMORY_TAG field 504 of the incoming memory address to create the memory line tag 402. In one embodiment, the ISDS 204 copies into the selected ISDS entry the line state information that was included in STORE request. The ISDS 204 marks the entry as valid by asserting the valid entry field 404 to indicate that the entry is valid. The flow continues at block 928.

Thus, a method and apparatus for maintaining coherence information in multi-cache systems have been described. Although the present invention has been described with reference to specific exemplary embodiments, it will be evident that various modifications and changes may be made to these embodiments without departing from the broader spirit and scope of the invention. Accordingly, the specification and drawings are to be regarded in an illustrative rather than a restrictive sense.

I claim:

1. A method comprising:
  receiving in an Ingrained Sharing Directory Cache (ISDC) an incoming operation request including an associated incoming memory address;
  determining if the incoming operation request is an Ingrained Sharing Directory Storage (ISDS) data reply, wherein the ISDS data reply includes an indication of system caches sharing a memory line having the same memory address as the incoming memory address, wherein the indication is extracted from two or more ISDS entries matching the incoming memory address;
  completing a pending ISDC entry if the incoming operation request is an ISDS data reply, wherein completing includes locating a pending ISDC operation associated with the ISDS data reply in an ISDC pending request queue;
  if the incoming operation request is not an ISDS data reply and if there is an ISDC entry associated with the incoming operation request, performing the incoming operation request; and
  if the incoming operation request is not an ISDS data reply and if there is no ISDC entry associated with the incoming operation request, creating an ISDC entry, wherein creating includes:
    requesting information associated with the incoming memory address from the ISDS;
    evicting another ISDC entry if there is no free ISDC entry, wherein evicting includes:
      requesting the ISDS to store the information for the evicted ISDC entry, wherein requesting includes transferring to the ISDS bit-vector information associated with the evicted ISDC entry, wherein the bit-vector information is used by the ISDS to select two or more ISDS cells, wherein each of the two or more ISDS cells maintains a dynamic full map of shared memory lines cached in a given set of one of the system caches and has an ISDS entry to be used to store status information for the evicted ISDC entry; and
    designating the evicted ISDC entry to the incoming operation request;
  marking the created ISDC entry as pending, wherein pending indicates that the ISDC entry is waiting to receive a data reply from the ISDS; and
  storing the incoming operation request into the ISDC pending request queue.

2. The method of claim 1, wherein the ISDC entry associated with the incoming memory address indicates whether one or more cached copies of a memory line at the same address as the incoming memory address are in shared or dirty-exclusive state.

3. A method comprising:
  receiving in an Ingrained Sharing Directory Cache (ISDC) an incoming operation request including an associated incoming memory address;
  determining whether a first ISDC entry associated with the incoming memory address is in the ISDC;
  if the first ISDC entry is not in the ISDC, creating the first ISDC entry, wherein creating includes:
    receiving a data reply associated with the incoming memory address from an Ingrained Sharing Directory Storage (ISDS), wherein the ISDS data reply includes an indication of system caches sharing a memory line having the same memory address as the incoming memory address, wherein the indication is extracted from two or more ISDS entries matching the incoming memory address;
    determining if there is a free ISDC entry in the ISDC;
    if the free ISDC entry is not in the ISDC, evicting a second ISDC entry, wherein evicting includes:
      requesting the ISDS to store the information for the evicted second ISDC entry, wherein requesting includes transferring to the ISDS bit-vector information associated with the evicted ISDC entry, wherein the bit-vector information is used by the ISDS to select two or more ISDS cells, wherein each of the two or more ISDS cells maintains a dynamic full map of shared memory lines cached in a given set of one of the system caches and has an ISDS entry to be used to store status information for the evicted ISDC entry; and designating the evicted second ISDC entry as the free ISDC entry; and replacing the free ISDC entry with the first ISDC entry, wherein replacing includes converting the indication of system caches in the ISDS data reply into bit-vector information associated with the first ISDC and storing status information of the two or more matching ISDS entries into corresponding fields of the first ISDC; and performing the incoming operation request using the first ISDC entry.

4. The method of claim 3 wherein evicting further includes marking the first ISDC entry pending, wherein pending indicates that the ISDC entry is waiting to receive a data reply from the ISDS.

5. The method of claim 4 further comprising completing a pending ISDC entry if the incoming operation request type is a data reply, wherein completing includes locating a pending ISDC operation in an ISDC pending request queue associated with the ISDS data reply.

6. The method of claim 3, wherein the ISDC entry associated with the incoming memory address indicates whether a system cache copy of a memory line unit is the only copy of the memory line in the system, wherein the memory line is located at the same address as the incoming memory address.

7. A machine-readable storage medium that provides instructions, which, when executed by a machine, cause the machine to perform operations comprising:

receiving in an Ingrained Sharing Directory Cache (ISDC) an incoming operation request including an associated incoming memory address;

determining whether a first ISDC entry associated with the incoming memory address is in the ISDC;

if the first ISDC entry is not in the ISDC, creating the first ISDC entry, wherein creating includes:

receiving a data reply associated with the incoming memory address from an Ingrained Sharing Directory Storage (ISDS), wherein the ISDS data reply includes an indication of system caches sharing a memory line having the same memory address as the incoming memory address, wherein the indication is extracted from two or more ISDS entries matching the incoming memory address;

determining if there is a free ISDC entry in the ISDC;

if the free ISDC entry is not in the ISDC, evicting a second ISDC entry, wherein evicting includes:

requesting the ISDS to store the information for the evicted second ISDC entry, wherein requesting includes transferring to the ISDS bit-vector information associated with the evicted ISDC entry, wherein the bit-vector information is used by the ISDS to select two or more ISDS cells, wherein the two or more ISDS cells maintains a dynamic full map of shared memory lines cached in a given set of one of the system caches and has an ISDS entry to be used to store status information for the evicted ISDC entry; and designating the evicted second ISDC entry as the free ISDC entry; and replacing the free ISDC entry with the first ISDC entry, wherein replacing includes converting the indication of system caches in the ISDS data reply into bit-vector information associated with the first ISDC and storing status information of the two or more matching ISDS entries into corresponding fields of the first ISDC; and performing the incoming operation request using the first ISDC entry.

8. The machine-readable medium of claim 7, wherein the evicting further includes marking the first ISDC entry pending, wherein pending indicates that the ISDC entry is waiting to receive a data reply from the ISDS.

9. The machine-readable medium of claim 8 further comprising completing a pending ISDC entry if the incoming operation request type is a data reply, wherein completing includes locating a pending ISDC operation in an ISDC pending request queue associated with the ISDS data reply.

10. The machine-readable medium of claim 7, wherein the ISDC entry associated with the incoming memory address indicates whether a system cache copy of a memory line unit is the only copy of the memory line in the system, wherein the memory line is located at the same address as the incoming memory address.

* * * * *

UNITED STATES PATENT AND TRADEMARK OFFICE
CERTIFICATE OF CORRECTION

PATENT NO.         : 7,370,154 B2
APPLICATION NO.    : 10/785575
DATED              : May 6, 2008
INVENTOR(S)        : Kaczynski It is certified that error appears in the above-identified patent and that said Letters Patent is hereby corrected as shown below:

On Sheet 9 of 9, in Fig. 9, line 3 (Box 930), delete "RETREIVE" and insert -- RETRIEVE --, therefor.

In column 1, lines 56-57, delete "DATAREPLY" and insert -- data --, therefor.

In column 6, lines 13, delete "RETRIVE" and insert -- RETRIEVE --, therefor.

In column 6, lines 14, delete "RETRIVE" and insert -- RETRIEVE --, therefor.

In column 7, line 63, after "VALID" insert -- _ --.

In column 7, line 63, after "DIRTY" insert -- _ --.

In column 8, line 11, after "VALID" insert -- _ --.

In column 9, lines 31, delete "RETREIVE" and insert -- RETRIEVE --, therefor.

In column 9, lines 31, delete "RETREIVE" and insert -- RETRIEVE --, therefor.

In column 10, lines 35, delete "RETREIVE" and insert -- RETRIEVE --, therefor.

In column 10, lines 36, delete "RETREIVE" and insert -- RETRIEVE --, therefor.

In column 11, lines 19, delete "valid entry" and insert -- VALID_ENTRY --, therefor.

In column 11, line 29, delete "dirty exclusive" and insert -- DIRTY_EXCLUSIVE --, therefor.

In column 11, line 35, delete "RETREIVE" and insert -- RETRIEVE --, therefor.

UNITED STATES PATENT AND TRADEMARK OFFICE
CERTIFICATE OF CORRECTION

PATENT NO.       : 7,370,154 B2
APPLICATION NO.  : 10/785575
DATED            : May 6, 2008
INVENTOR(S)      : Kaczynski It is certified that error appears in the above-identified patent and that said Letters Patent is hereby corrected as shown below:

In column 11, line 46, delete "valid entry" and insert -- VALID_ENTRY --, therefor.

Signed and Sealed this

Nineteenth Day of August, 2008

JON W. DUDAS
*Director of the United States Patent and Trademark Office*